No. 645,598. Patented Mar. 20, 1900.
O. KNEUSEL.
KNEE BRACE FOR BICYCLES, &c.
(Application filed Mar. 17, 1899.)

(No Model.)

Witnesses.
Wm. M. Rheem.
Edna B. Johnson.

Inventor
Otto Kneusel
by Elliott & Hopkins
Att'ys

THE NORRIS PETERS CO., PHOTO-LITHO., WASHINGTON, D. C.

UNITED STATES PATENT OFFICE.

OTTO KNEUSEL, OF CHICAGO, ILLINOIS.

KNEE-BRACE FOR BICYCLES, &c.

SPECIFICATION forming part of Letters Patent No. 645,598, dated March 20, 1900.

Application filed March 17, 1899. Serial No. 709,455. (No model.)

*To all whom it may concern:*

Be it known that I, OTTO KNEUSEL, a citizen of the United States, residing at Chicago, in the county of Cook and State of Illinois, have invented certain new and useful Improvements in Knee-Braces for Bicycles and other Velocipedes, of which the following is a full, clear, and exact specification.

My invention relates to knee-braces for velocipedes, and more particularly for bicycles; and it has for its object to provide a brace for the knee of the rider which while permitting of the free action of the latter in propelling the machine will steady or brace the knees against side deflection, and thus make the rider more secure in the saddle and afford better control of the machine independently of the handle-bars, thus enabling the rider to ride "hands off" with greater confidence and safety than heretofore.

With these ends in view my invention consists in certain features of novelty in the construction, combination, and arrangement of parts by which the said objects and certain other objects hereinafter appearing are attained, all as fully described, with reference to the accompanying drawings, and more particularly pointed out in the claims.

Figure 1:
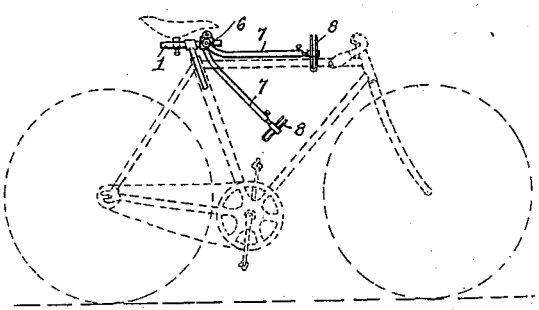
Figure 2:
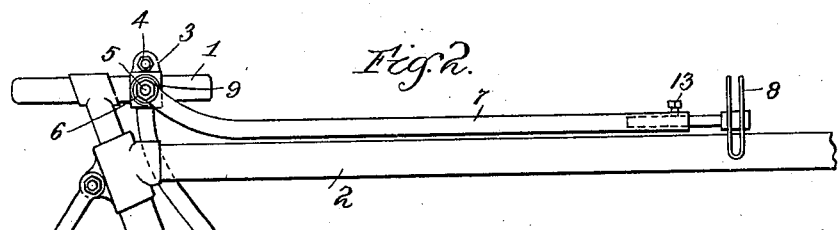
Figure 5:
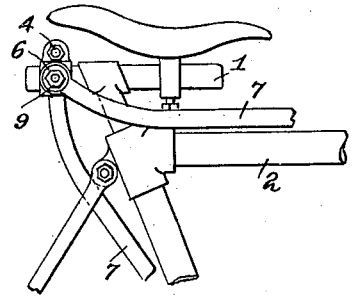
Figure 3:
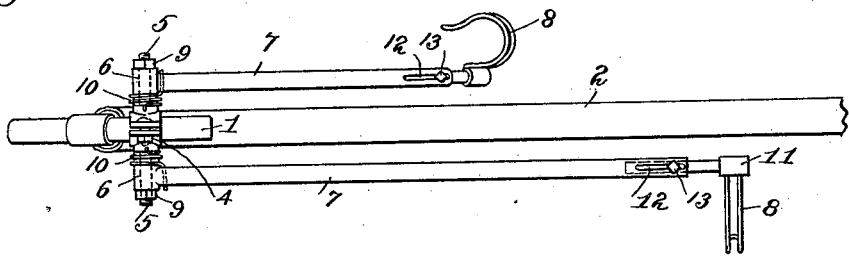
Figure 4:
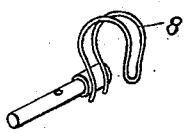

In the said drawings, Figure 1 is a side elevation of a bicycle shown in dotted lines and provided with my improvements. Fig. 2 is an enlarged side elevation thereof, showing the saddle-post and a part of the frame, the saddle being removed. Fig. 3 is a plan view thereof. Fig. 4 is a perspective view of one of the knee-clips; and Fig. 5 is a view similar to Fig. 2, showing a different arrangement of the device.

In carrying out my invention I attach to the frame of the velocipede in any suitable way a pair of clips which embrace the knees of the rider and move approximately in the same arc described by the knees during the propelling of the machine. The most convenient and efficient way to accomplish this is to mount the clips at the ends of arms pivoted under or approximately under the saddle. 1 represents the T-head of the saddle-post, and 2 the horizontal top member of the bicycle-frame. To this T-head 1 I clamp a collar or clip 3 by means of a set-bolt 4, which has projecting from each side thereof a pintle 5, and upon each of these pintles is journaled one of the hubs 6 of a pair of arms 7, which carry the aforesaid knee-clips 8. The hubs 6 are held in place on the pintles 5 by means of nuts 9, and the arms 7 are preferably returned to a normal horizontal position when not in use by means of coiled springs 10, having one end secured to the clip 3 and the other to the arms 7. The arms 7 lie close to the horizontal member 2 of the bicycle-frame, so that the clips 8 will be in position to fit over the upper sides of the knees of the rider, and for the sake of symmetry the arms are curved downwardly slightly at their rear ends, as shown in Fig. 2, to bring them approximately parallel with the bar 2 when not in use.

By pivoting the arms to the saddle-post it will be seen that I bring their pivotal point in close proximity to the center of oscillation of the knee of the rider. If desired, the clip 3 may be placed on the rear end of the T-head 1 should that position better suit the peculiarities of the rider's posture, as shown in Fig. 5.

The clips 8 are preferably horseshoe shape and composed of a double flexible wire, as better illustrated in Fig. 4, which is secured at one side to the outer end of an adjustable rod or stem 11, inserted in the outer ends of the arms 7, which may be constructed of tubing and provided with a longitudinal slot 12, through which works a set-screw 13, having its end engaged in the stem 11 and being adapted to clamp the stem firmly in position with relation to the arms 7 or to permit the stem to slide back and forth, and thus prevent the clip from sliding on the knee of the rider in the event there should be any substantial difference between the centers of oscillation of the arms 7 and of the rider's knees.

I am aware that it is not new to provide a bicycle with an equalizing appliance consisting of hooks or clips adapted to embrace the legs of the rider and being connected with the frame of the bicycle by a flexible connection permitting the clips to move in any direction, and I am also aware that it is not new to arrange auxiliary pedals on pivoted arms in such manner that the under side of the leg will press thereagainst when forcing downwardly on the primary pedals of the bicycle, so as to assist in propelling the machine through suitable gearing connected to the said pivoted arms; but neither of these devices is the equivalent of my invention, nor do I wish to claim the same, for my invention differs therefrom in that it holds the knees of the rider against side deflection and is intended solely for this purpose, whereas neither of the prior devices aforesaid is capable of accomplishing this end.

Having thus described my invention, what I claim as new therein, and desire to secure by Letters Patent, is—

1. In a device for preventing lateral deflection of the rider's knees, the combination with a velocipede of a pair of arms pivoted thereto and held against side deflection, said arms being movable in a vertical arc and means on said arms for embracing the knees of the rider and holding them against lateral movement with relation to the arms, substantially as set forth.

2. The combination of a velocipede of a pair of knee-braces attached thereto and consisting of a pair of pivoted arms, a pair of clips for embracing the knees and a sliding connection between said arms and clips, substantially as set forth.

3. The combination with a velocipede having a saddle-post, of the clip 3 clamped upon said post, pintles projecting from said clip, arms pivoted on said pintles respectively and projecting forwardly, knee-clips carried by said arms, and springs for returning said arms to a horizontal position, substantially as set forth.

OTTO KNEUSEL.

Witnesses:
EDNA B. JOHNSON,
F. A. HOPKINS.